Oct. 21, 1969     A. A. GRAN ET AL     3,473,165

VENTING DEVICE FOR PRESSURIZED SPACE SUIT HELMET

Filed Feb. 27, 1967     2 Sheets-Sheet 1

INVENTORS.
RONALD LANG
ALFRED A. GRAN
BY Steward & Steward

United States Patent Office 3,473,165
Patented Oct. 21, 1969

1

3,473,165
VENTING DEVICE FOR PRESSURIZED
SPACE SUIT HELMET
Alfred A. Gran, Warehouse Point, and Ronald Lang, Manchester, Conn., assignors, by mesne assignments, to the United States of America as represented by the Administrator of the National Aeronautics and Space Administration
Filed Feb. 27, 1967, Ser. No. 618,969
Int. Cl. A42b *3/00;* A62b *18/04*
U.S. Cl. 2—6                                             11 Claims

ABSTRACT OF THE DISCLOSURE

A venting device comprising a fixture mounted in the faceplate of a crewman's helmet for use with a pressurized space suit, wherein the device incorporates valve means providing controlled venting of the helmet in the oral-nasal area and incorporating a collapsible duct or funnel positionable between a collapsed stowed condition adjacent the faceplate and an operating position in which it projects into abutment with the mouth of the crewman for elimination of vomitus expelled by the crewman.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to venting devices for a pressurized space suit helmet, and more particularly to a venting or scavenging system for use in such application in order principally to provide for eliminating vomitus from inside the helmet during pressurized space suit operation under zero or very low gravity conditions. The device may also provide a purge mode as well as a feed mode of operation, as will appear hereinafter.

It is a principal purpose of the invention to provide a device of the foregoing character which is mountable in the usual faceplate of a pressurized space suit helmet in such manner as to be in optimum position for ready use when needed by the wearer, but which at the same time introduces as little obstruction to the wearer's view and as little encumberance to his mobility as possible. To this end, the device of the invention is capable of being stowed in non-operating position from which it may be moved easily and rapidly by the wearer to assume an operative position. Such operative position may provide simply for venting or purging the interior of the helmet and space suit, for a feeding mode or for vomitus elimination. Provision is made for collecting vomitus externally in a disposable receiver while allowing concurrent pass-through of oxygen or other gases to occur.

The device, in brief, comprises a fixture which is sealed directly in the faceplate of the helmet, being mounted in an aperture formed therein for the purpose, in juxtaposition to the mouth of the wearer. This fixture incorporates a port and valve means for closing the port to control communication between the atmosphere within the helmet and space suit, and the ambient atmosphere to which the wearer is exposed. A mouthpiece is secured to the aforesaid fixture inside the helmet in communication with the aforesaid port. This mouthpiece takes the form of a collapsible funnel or similar duct which is movable between an operative position, in which it is fully extended to abut against the mouth of the wearer, and a stowed or collapsed position immediately adjacent the inner surface of the faceplate of the helmet. Control means interconnecting the mouthpiece and the valve is operable by the user to move the mouthpiece automatically from its stowed position when the valve is in its port-closing position to the extended or operative position when the valve is moved to its port-opening position. A gas-permeable pouch is detachably secured to the exterior of the venting device to communicate with the port thereof and to receive and collect vomitus expelled through the port. In the event that it is merely desired to purge the atmosphere within the helmet, the valve has provision for introducing a restriction in the port to limit the out flow, in which condition the pouch or porous bag may or may not be attached to the device. In still another mode of operation, the valve may include provision for a setting to allow direct introduction through the port of feeding means, such as a tube, for introducing food into the mouth of the crewman.

The invention is illustrated by a typical embodiment of the venting device for a pressurized space suit helmet shown in the accompanying drawings, in which FIG. 1 is a view of a pressurized space suit helmet in position on the head of the crewman, in which the novel venting device is incorporated;

Figure 1:
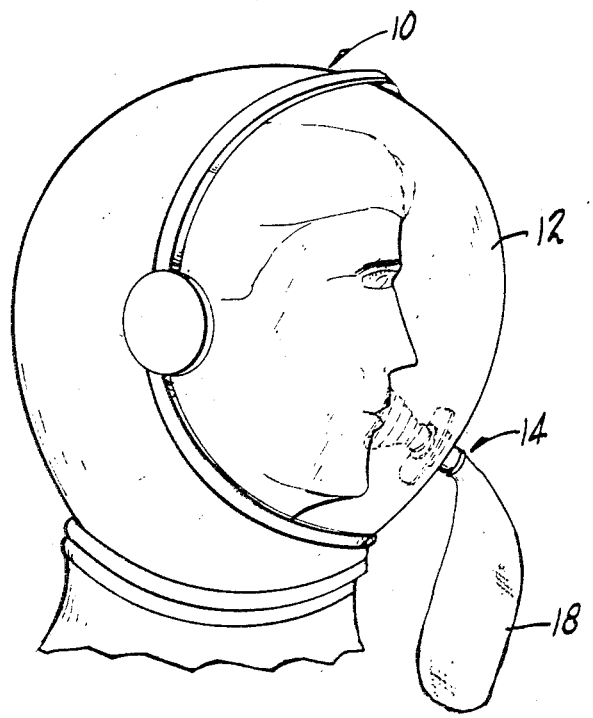
Figure 2:
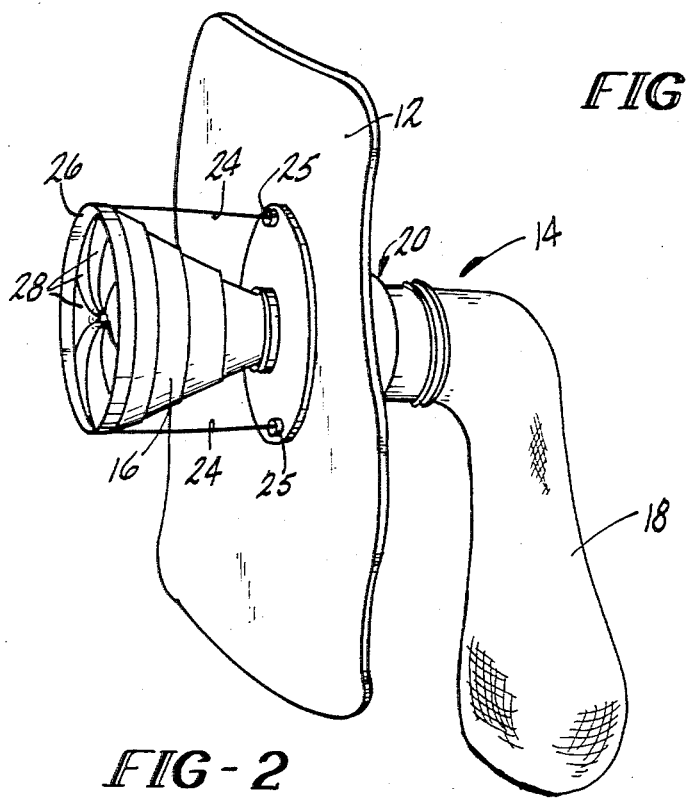
FIG. 2 is a fragmentary view showing the venting device on an enlarged scale and in somewhat greater detail.

As seen in FIG. 1, a helmet 10 of the type used in connection with a pressurized space suit incorporates a transparent faceplate 12 on which the venting device 14 of the present invention is mounted. The device is shown in its operative position for receiving vomitus expelled from the mouth of the person wearing the helmet. The venting device itself is shown in greater detail in FIG. 2 and includes a generally funnel-like mouthpiece 16, a disposable gas-permeable pouch 18 and a valve housing 20 interconnecting the two and supporting the device in a suitable aperture 22 provided in the faceplate 12 to which it is sealed.

Pouch 18 comprises a semiporous, gas-permeable sack closed at one end and having a mouth adapted to be secured, as by a snap ring 19, to a portion of the valve housing 20.

Figure 6:
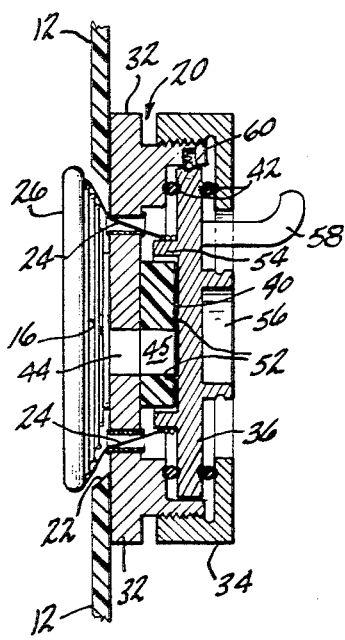
FIG. 6 is a similar view with the port disc in position to close the port completely and fully retract the collapsible mouthpiece.

The mouthpiece of the venting device is a funnel-type unit which is made of pliable material supported by a light spiral compression spring so as to form a bellows collapsible downwardly toward the faceplate 12, as seen best in FIG. 6. By reason of the spring, the mouthpiece normally assumes the projecting position illustrated in FIGS. 1 and 2 so that it is abutted against the mouth of the wearer.

The mouthpiece is collapsed against the normal bias of its bellows spring by two or more retracting cables 24 secured to the outer end of the mouthpiece and passing through eyelet guides 25 in valve housing 20.

Lip 26 of the mouthpiece is formed with a stiff ring covered by suitably soft, resilient protective material to prevent injury to the wearer. The mouthpiece is also provided at its outer end with a flapper valve assembly comprising a plurality of segmental finger 28 of rubber-like resilient material, each of which is secured adjacent lip 26 of the mouthpiece and projects inwardly toward the center, forming a check valve to retard return flow from the mouthpiece.

Figure 3:
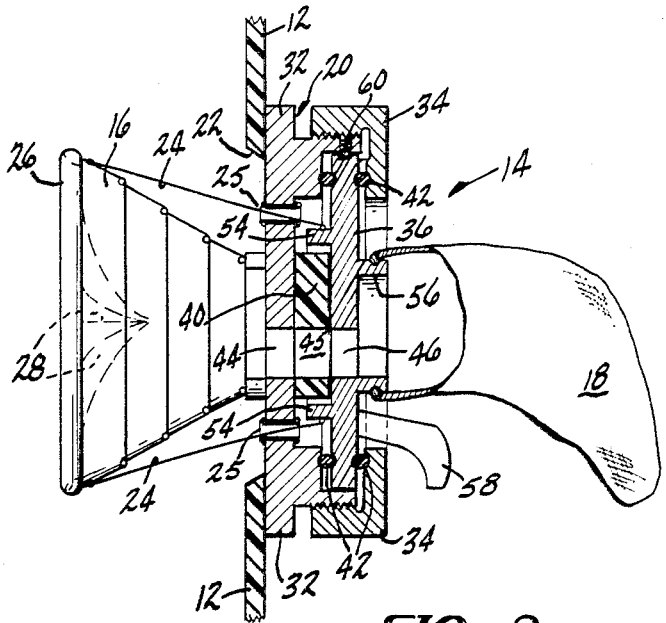
FIG. 3 is a side view, partly in section, of the device shown in FIG. 2.

Referring now more particularly to FIG. 3, venting device 14 comprises an assembly of a supporting plate 32 and a removable retaining ring 34 which together form housing 20 of the unit. In addition, the unit includes a port disc 36 which is received in a well 38 formed in the exterior surface of plate 32, port disc 36 being retained in the well by peripherally overhanging flanges of retaining ring 34. An elastic disc 40 is positioned between port disc 36 and the adjacent face of support plate 32 to form a seal at the junction, and disc 36 is further provided with O-ring seals 42 on either face near the periphery of the disc, one being disposed between the disc and support plate 32, the other between the disc and retaining ring 34. The arrangement hermetically seals the periphery of the disc but permits it to be rotated relative to the housing, as will be further described presently.

Support plate 32 is formed with a suitable port 44 which communicates with the inner end of mouthpiece 16. A similar port 45 is formed in the resilient disc 40 and is held in registry with the first port by cementing or otherwise securing the disc to the outer face of the support plate 32.

Figure 4:
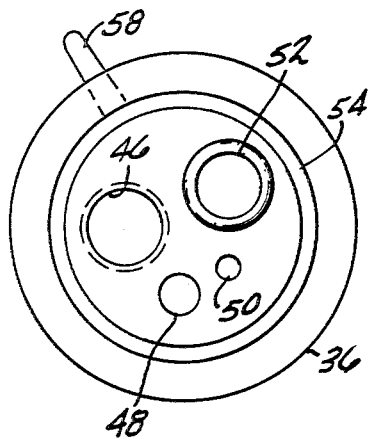
FIG. 4 is a plan view of the valve or port control disc of the device seen in FIG. 3.

As seen best in FIG. 4, port disc 36 is formed with a series of ports 46, 48, and 50 designated, respectively, for vomitus removal, purge, and feed modes of operation. Port disc 36 is also provided on its inner face with a raised annular rib 52 on the surface of the disc which is imperforate within the periphery of rib 52. The foregoing ports and annular rib are all surrounded by an annular flange forming a drum 54 on the inner face of the disc.

On its outer face, disc 36 is formed with a collar 56 (see FIG. 3). As here shown, collar 56 encircles all three of ports 46, 48 and 50 but could as well encircle only the purge port 46 since it serves as means for attaching the pouch 18 which is needed only in the vomitus removal mode of operation. Port disc 36 is provided with means, in this instance a handle 58, to permit rotation of the disc by the crewman.

Figure 5:
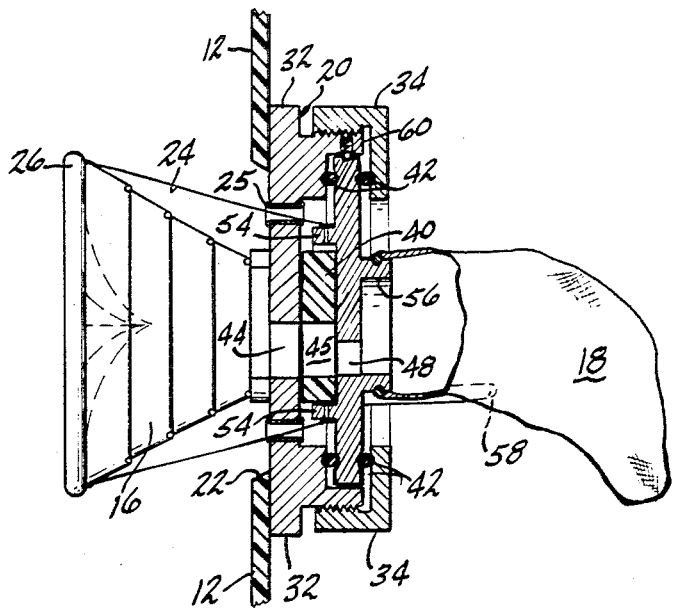
FIG. 5 is a view similar to that in FIG. 3 but showing the venting device with the port disc in a different position.

As seen in FIG. 3, port disc 36 is rotatively positioned to align vomitus port 46 with the registering ports 44, 45 in the support plate 32 and resilient disc 40, respectively. As seen in FIG. 5, disc 36 has been rotated to a position aligning purge port 48 with the ports 44, 45 in the housing. In similar manner, the alignment of feed port 50 with ports 44, 45 may be accomplished. And finally as seen in FIG. 6, disc 36 has been rotated to the fully closed position of the device, wherein the annular rib 52 is brought into registry with ports 44, 45, thereby sealing off the passage through the device.

It will be further noted that in moving the port disc from the position shown in FIG. 3 to that shown in FIG. 5 and finally to that shown in FIG. 6, the retraction cables 24, which are secured at their inner ends to drum 54 of the plate, are drawn in as they are wound around the drum, thereby collapsing the bellows-type mouthpiece against the faceplate 12 of the helmet.

In order to secure proper alignment of the ports in the various angularly rotated positions of the port disc 36, suitable detent means, such as a spring and ball detent 60, may be used to cooperate with depressions formed in the periphery of the disc, effecting quick and positive alignment in the several possible positions. A suitable stop pin (not shown) may also be provided to limit the rotation of the port disc only to the extent permitted by the length of the retraction cable 24.

The venting device is particularly suitable for the vomitus removal and purging modes of operation which are illustrated in FIGS. 3 and 5, respectively, of the drawings. Operation of the device is very simple. Assuming that the device is in an initial closed condition as illustrated in FIG. 6, when the crewman requires purging he simply rotates the port disc by means of handle 38 to the purge position shown in FIG. 5 which aligns the purge port 48 with the ports in the valve housing. Although the vomitus receiving pouch 18 is shown attached to the assembly in this illustration, obviously it shall not be for purge operation. In this condition, the device permits a controlled out-flow of gas from the oral-nasal area of the helmet into the ambient atmosphere. In order to control this, the purge port is so sized that the suit pressure can be maintained by the ventilating system, yet sufficient gas out-flow is permitted to remove carbon dioxide, etc., expelled by the crewman. The design of the unit is such that for the purge mode of operation, the mouthpiece is partially extended, bringing it closer to the oral-nasal area when purging and carbon dioxide removal is most required. The arrangement has the added benefit that, if necessary, the user can place his mouth against the mouthpiece 16 more effectively to expel the noxious carbon dioxide from the space suit. The crewman stops the purging mode simply by returning the port disc 36 to the closed position by means of the access handle 58.

If the user requires the vomitus operation or mode of the device, he attaches the vomitus bag 18 to the valve assembly by means of snap ring 19. He then rotates the valve handle 58 to the vomitus position, which at the same time allows the mouthpiece automatically to assume its extended position under the urging of the spring-loaded bellows. In this position, which is the position illustrated in FIG. 3, purge port 46 is brought into alignment with the ports in the valve housing. When the user no longer requires the vomitus device, he again returns the valve handle to the closed position which at the same time winds the mouthpiece retraction cables onto the retraction drum 54, thereby retracting the mouthpiece so that it will not be an obstruction. The vomitus bag with its contents may then be removed from the valve assembly.

What is claimed is:

1. In a pressurized space suit helmet having a faceplate, a venting device, means mounting said venting device in said faceplate in juxtaposition to the mouth of the wearer, said venting device having a mouthpiece accessible to the wearer, a housing for supporting said device in the faceplate and having a port for communicating said mouthpiece with the ambient atmosphere, valve means associated with said housing to open and close said port and a gas-permeable pouch having a mouth and means detachably securing the mouth on the exterior of said device to enclose the outlet of said port.

2. A venting device as defined in claim 1, wherein said valve means comprises a member having a port therein for registry with said port in said housing, said member being shiftable from a first position in which said ports are in registry, thereby venting the interior of the helmet to ambient outside atmosphere, to a second position wherein said ports are out of registry, thereby blocking the venting of said helmet, said shiftable member having at least one additional port and being shiftable to positions intermediate said first and second positions to align said additional ports with the port in said housing.

3. A venting device as defined in claim 1, wherein said mouthpiece is a collapsible funnel means securing the smaller end of said collapsible funnel to the inner side of said housing and surrounding the port therein, said funnel being movable from an extended position, in which it projects inwardly of the face plate of the helmet toward the mouth of the wearer, to a collapsed position immediately adjacent said housing.

4. A venting device as defined in claim 3, wherein said valve means comprises a member having a port therein for registry with the port in said housing, said member being shiftable from a first position in which said ports are in registry, thereby venting the interior of the helmet to ambient atmosphere, to a second position wherein said ports are out of registry, thereby blocking the venting of said helmet, and means operably interconnecting said shiftable member and said collapsible funnel, whereby said funnel is collapsed when said shiftable member is moved to port-closing position and said funnel is extended when said shiftable member is moved to port-opening position.

5. A venting device as defined in claim 4, wherein said shiftable member is a circular plate and said housing includes means for sealingly supporting said plate for rotation between said port-opening and port-closing positions.

6. A venting device as defined in claim 5, wherein said funnel is normally biased to extended position, a drum on the interior surface of said circular plate, at least two flexible cables secured at one end to said drum and at its other end to the outer end of said funnel, and guide means in said housing through which said flexible cable passes as it winds on and uwinds from the drum with rotation of said circular plate.

7. A venting device as defined in claim 5, wherein said housing means for rotatably supporting said circular plate comprises a circular well formed in the exterior face of said housing within which said plate is received, and a retaining flange, means detachably mounting said retaining flange on said housing to peripherally overlie said plate in said well and retain the latter therein, and peripheral sealing means between said housing, plate and flange to hermetically seal said plate to said housing while permitting relative rotation to occur between them.

8. A venting device as defined in claim 7, which includes a resilient compressible disc, means securing said resilient, compressible disc to said housing and disposed between it and said circular plate, said disc having an aperture therein conforming to and in registry with the port in said housing, and said circular plate is formed with an upstanding annular rib on its face adjacent said resilient disc, said plate being rotatable to a position to cause said rib to register with and compress said resilient disc peripherally of the port therein to form a seal therewith.

9. A venting device as defined in claim 2, wherein said shiftable member is a circular plate and said housing includes means for rotatably supporting said plate for rotation between said port-opening and port-closing positions.

10. A venting device as defined in claim 9, wherein the several ports in said circular plate are each of a different size and all except one are smaller than the port in said housing.

11. A venting device as defined in claim 1, wherein said mouthpiece is provided with a plurality of resilient segmental fingers, means securing each of said resilient segmented fingers to the lip of the mouthpiece, said resilient segmented fingers projecting inwardly to the center thereof to form a flapper valve resisting return flow from the mouthpiece.

References Cited
UNITED STATES PATENTS

| | | | |
|---|---|---|---|
| 2,344,920 | 3/1944 | Maggi | 2—9 |
| 3,067,425 | 12/1962 | Colley | 2—6 |
| 3,359,568 | 12/1967 | Kothe | 2—6 |

JAMES R. BOLER, Primary Examiner

U.S. Cl. X.R.

2—2.1; 128—142.7